(12) United States Patent
Nakamura et al.

(10) Patent No.: US 7,908,563 B2
(45) Date of Patent: Mar. 15, 2011

(54) DISPLAY CONTROL SYSTEM, IMAGE PROCESING APPARATUS, AND DISPLAY CONTROL METHOD

(75) Inventors: Mahina Nakamura, Musashino (JP); Maki Sato, Yokohama (JP); Tsunehiro Motegi, Shinjuku-ku (JP); Yumiko Okuma, Nakano-ku (JP); Yasutsugu Sasaki, Kawasaki (JP)

(73) Assignees: Kabushiki Kaisha Toshiba, Tokyo (JP); Toshiba Tec Kabushiki Kaisha, Tokyo (JP)

( * ) Notice: Subject to any disclaimer, the term of this patent is extended or adjusted under 35 U.S.C. 154(b) by 986 days.

(21) Appl. No.: 11/736,698

(22) Filed: Apr. 18, 2007

(65) Prior Publication Data

US 2007/0283293 A1 Dec. 6, 2007

(30) Foreign Application Priority Data

Apr. 20, 2006 (JP) .................................. 2006-116715

(51) Int. Cl.
*G06F 3/00* (2006.01)
(52) U.S. Cl. .......... 715/764; 715/859; 715/845; 715/748
(58) Field of Classification Search .................. 715/845, 715/748, 859, 764
See application file for complete search history.

(56) References Cited

U.S. PATENT DOCUMENTS

| 5,847,857 | A | * | 12/1998 | Yajima et al. | 358/468 |
| 6,674,537 | B2 | * | 1/2004 | Kadowaki | 358/1.15 |
| 2003/0030664 | A1 | * | 2/2003 | Parry | 345/744 |
| 2003/0041102 | A1 | * | 2/2003 | Simpson et al. | 709/203 |
| 2003/0043404 | A1 | * | 3/2003 | Fetherolf et al. | 358/1.15 |
| 2003/0067488 | A1 | * | 4/2003 | Rudd et al. | 345/765 |
| 2003/0103233 | A1 | * | 6/2003 | Struble | 358/1.15 |
| 2003/0211845 | A1 | * | 11/2003 | Lohtia et al. | 455/414.3 |
| 2007/0247641 | A1 | | 10/2007 | Okuma et al. | |
| 2007/0247642 | A1 | | 10/2007 | Nakamura et al. | |
| 2007/0247643 | A1 | | 10/2007 | Nakamura et al. | |
| 2007/0250785 | A1 | | 10/2007 | Nakamura et al. | |
| 2007/0250936 | A1 | | 10/2007 | Nakamura et al. | |

FOREIGN PATENT DOCUMENTS

| JP | 2000-349952 | 12/2000 |
| JP | 2003-289419 | 10/2003 |
| JP | 2004-264540 | 9/2004 |
| JP | 2004-312711 | 11/2004 |

* cited by examiner

*Primary Examiner* — Weilun Lo
*Assistant Examiner* — Mylinh Tran
(74) *Attorney, Agent, or Firm* — Turocy & Watson, LLP

(57) ABSTRACT

There is provided a technique capable of contributing to an improvement in operability and working efficiency.

A display control system comprises: an identification information acquisition section 201 that acquires identification information for identifying a user who uses a second device 41; an operation determination section 202 that determines whether there is any uncompleted job among those for which the relevant operation has started in the first device 11; an operation history acquisition section 203 that acquires information concerning the operation history; a setting information acquisition section 204 that acquires setting information concerning the display of an interface screen; and a screen control section 205 that displays the interface screen on the second device 41 and, at the same time, reflects the information acquired by the operation history acquisition section 203 on the interface screen as operation content.

15 Claims, 11 Drawing Sheets

DISPLAY CONTROL SYSTEM, IMAGE PROCESING APPARATUS, AND DISPLAY CONTROL METHOD

BACKGROUND OF THE INVENTION

1. Field of the Invention

The present invention relates to a display control technique of objects to be displayed on an interface screen, such as characters and icons.

2. Description of the Related Art

There is known a technique that uses a printer driver or the like to remotely execute predetermined image processing in an image processing apparatus from an external device such as a PC (refer to, e.g., Jpn. Pat. Appln. Laid-Open Publications Nos. 2004-312711, 2004-264540, 2003-289419, 2000-349952).

However, in the above technique, the interface screen of the printer driver displayed on the external device and that of the image processing apparatus have no commonality with each other and entirely differ from each other in terms of design or information classification scheme.

As describe above, operation procedures entirely differ between the image processing apparatus and external device (printer driver, etc.) even in the case where the same operation is performed. Therefore, a user needs to learn two types of operation procedures, i.e., the operation procedure on the image processing apparatus and that on the external device, adversely affecting operability and workability.

Further, the operation procedure in image processing apparatuses of recent years becomes complicated, which may require substantial time to perform its operation. However, since an image processing apparatus installed in an office or the like is shared by a plurality of users in general, it is not preferable that one user occupies the image processing apparatus. Thus, in the case where a given user is performing a complicated setting operation for some sort of image processing, if there is another user who has an urgent need to use the image processing apparatus, the user who is performing the setting operation temporarily cancels the setting content, allows the another user to use the image processing apparatus for his or her urgent task, and then restarts the same setting operation once again. Such a situation is not preferable in terms of working efficiency.

SUMMARY OF THE INVENTION

An embodiment of the present invention has been made to solve the above problems, and an object there of is to provide a technique capable of reducing time period during which an apparatus to be shared by a plurality of users is occupied by a specified user performing a setting operation and contributing to an improvement in operability and working efficiency.

To solve the above problems, according to a first aspect of the present invention, there is provided a display control system comprising: an identification information acquisition section that acquires identification information for identifying a user who uses a second device communicably connected to a first device that can execute predetermined processing to perform a predetermined relevant operation concerning execution of the predetermined processing; an operation determination section that determines whether there is any uncompleted job among those for which the relevant operation has started in the first device by the user whose identification information has been acquired by the identification information acquisition section; an operation history acquisition section that acquires information concerning the operation history in the relevant operation for the uncompleted predetermined processing in the case where it has been determined by the operation determination section that there is any uncompleted predetermined processing; a setting information acquisition section that acquires setting information concerning the display of an interface screen corresponding to the user whose identification information has been acquired by the identification information acquisition section; and a screen control section that displays the interface screen on the second device based on the information acquired from the setting information acquisition section and, at the same time, reflects the information acquired by the operation history acquisition section on the interface screen as operation content.

According to a second aspect of the present invention, there is provided an image processing apparatus capable of executing predetermined image processing, comprising: an identification information acquisition section that acquires identification information for identifying a user who uses an external device communicably connected to the image processing apparatus to perform a predetermined relevant operation concerning execution of the predetermined image processing in the image processing apparatus; an operation determination section that determines whether there is any uncompleted job among those for which the relevant operation has started in the image processing apparatus by the user whose identification information has been acquired by the identification information acquisition section; and a transmission section that transmits information of the operation history in the relevant operation concerning the uncompleted predetermined processing to the external device in the case where the it has been determined by the operation determination section that there is any uncompleted predetermined processing.

According to a third aspect of the present invention, there is provided a display control method comprising: acquiring identification information for identifying a user who uses a second device communicably connected to a first device that can execute predetermined processing to perform a predetermined relevant operation concerning execution of the predetermined processing; determining whether there is any uncompleted job among those for which the relevant operation has started in the first device by the user whose identification information has been acquired by the identification information acquisition step; acquiring information concerning the operation history in the relevant operation for the uncompleted predetermined processing in the case where it has been determined by the operation determination step that there is any uncompleted predetermined processing; acquiring setting information concerning the display of an interface screen corresponding to the user whose identification information has been acquired by the identification information acquisition step; and then displaying the interface screen on the second device based on the information acquired from the setting information acquisition step and, at the same time, reflecting the information acquired by the operation history acquisition step on the interface screen as operation content.

According to a fourth aspect of the present invention, there is provided a display control system comprising: an identification information acquisition means for acquiring identification information for identifying a user who uses a second device communicably connected to a first device that can execute predetermined processing to perform a predetermined relevant operation concerning execution of the predetermined processing; an operation determination means for determining whether there is any uncompleted job among those for which the relevant operation has started in the first device by the user whose identification information has been acquired by the identification information acquisition means; an operation history acquisition means for acquiring information concerning the operation history in the relevant operation for the uncompleted predetermined processing in the case where it has been determined by the operation determination means that there is any uncompleted predetermined processing; a setting information acquisition means for acquiring setting information concerning the display of an interface screen corresponding to the user whose identification information has been acquired by the identification information acquisition means; and a screen control means for displaying the interface screen on the second device based on the information acquired from the setting information acquisition means and, at the same time, reflecting the information acquired by the operation history acquisition means on the interface screen as operation content.

DESCRIPTION OF THE PREFERRED EMBODIMENTS

Figure 1:
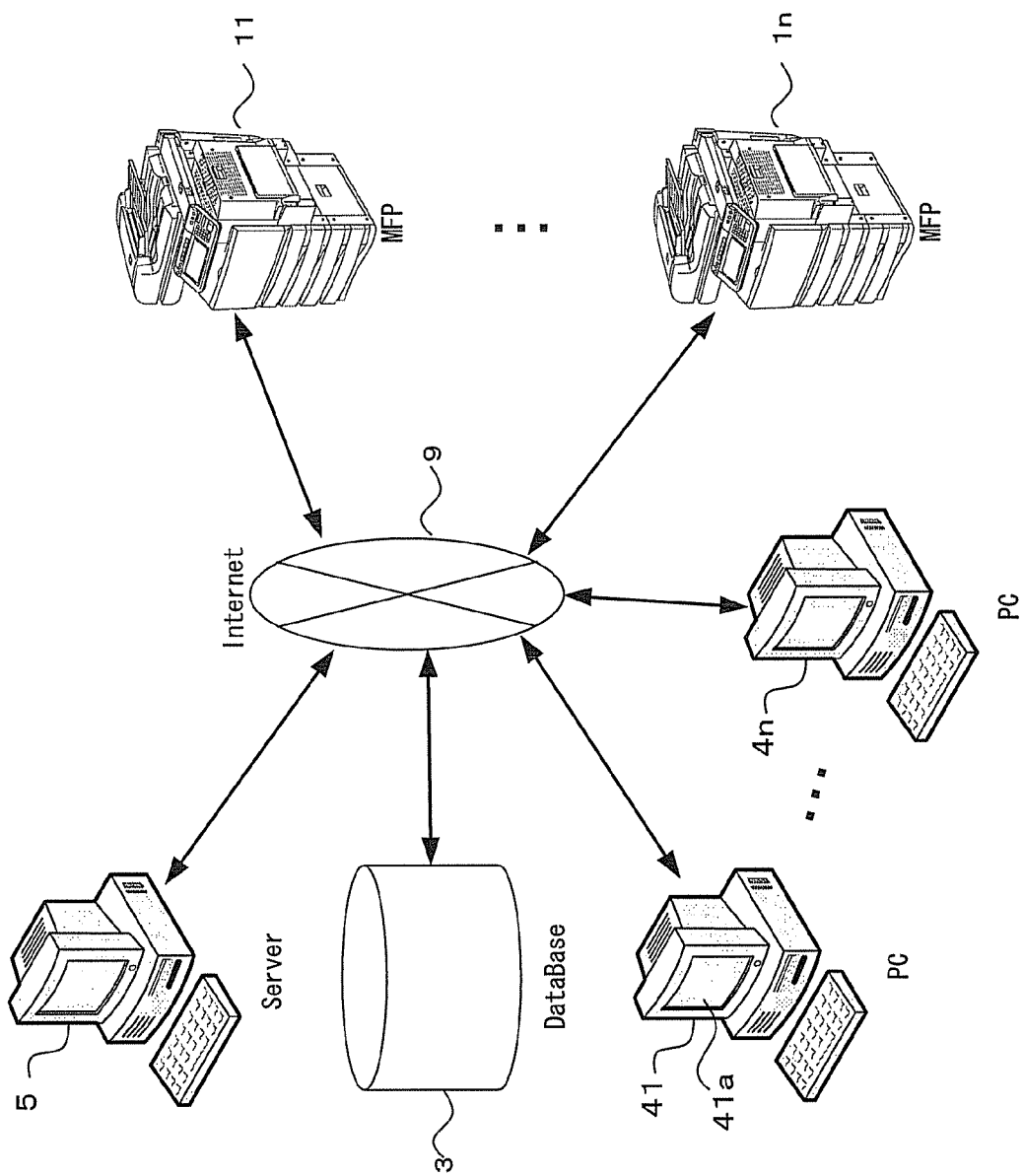
FIG. 1 is a view showing a configuration of a display control system according to an embodiment of the present invention, including an image processing apparatus 11.

Am embodiment of the present invention will be described below with reference to the accompanying drawings. FIG. 1 is a view showing a configuration of a display control system according to the present embodiment, including an image processing apparatus 11. In the display control system shown in FIG. 1, image processing apparatuses 11 to 1n, a database 3, PCs (Personal Computers) 41 to 4n, and a server 5 are connected to each other through an electric communication line such as the Internet 9 in a communicable manner.

Although image processing apparatuses 11 to 1n, database 3, PCs 41 to 4n, and server 5 are communicably connected to each other through the Internet in this example, a wired or wireless LAN or WAN may be used to connect them. A user can use the PCs 41 to 4n to make various settings for image processing performed in the image processing apparatuses 11 to 1n and to issue an instruction to execute the image processing to the image processing apparatuses 11 to 1n. The instructions from the PCs 41 to 4n to the image processing apparatuses 11 to 1n are made through drivers installed in the respective PCs 41 to 4n. The database 3 serves as a storage area for storing various setting information used by the PCs 41 to 4n.

Figure 2:
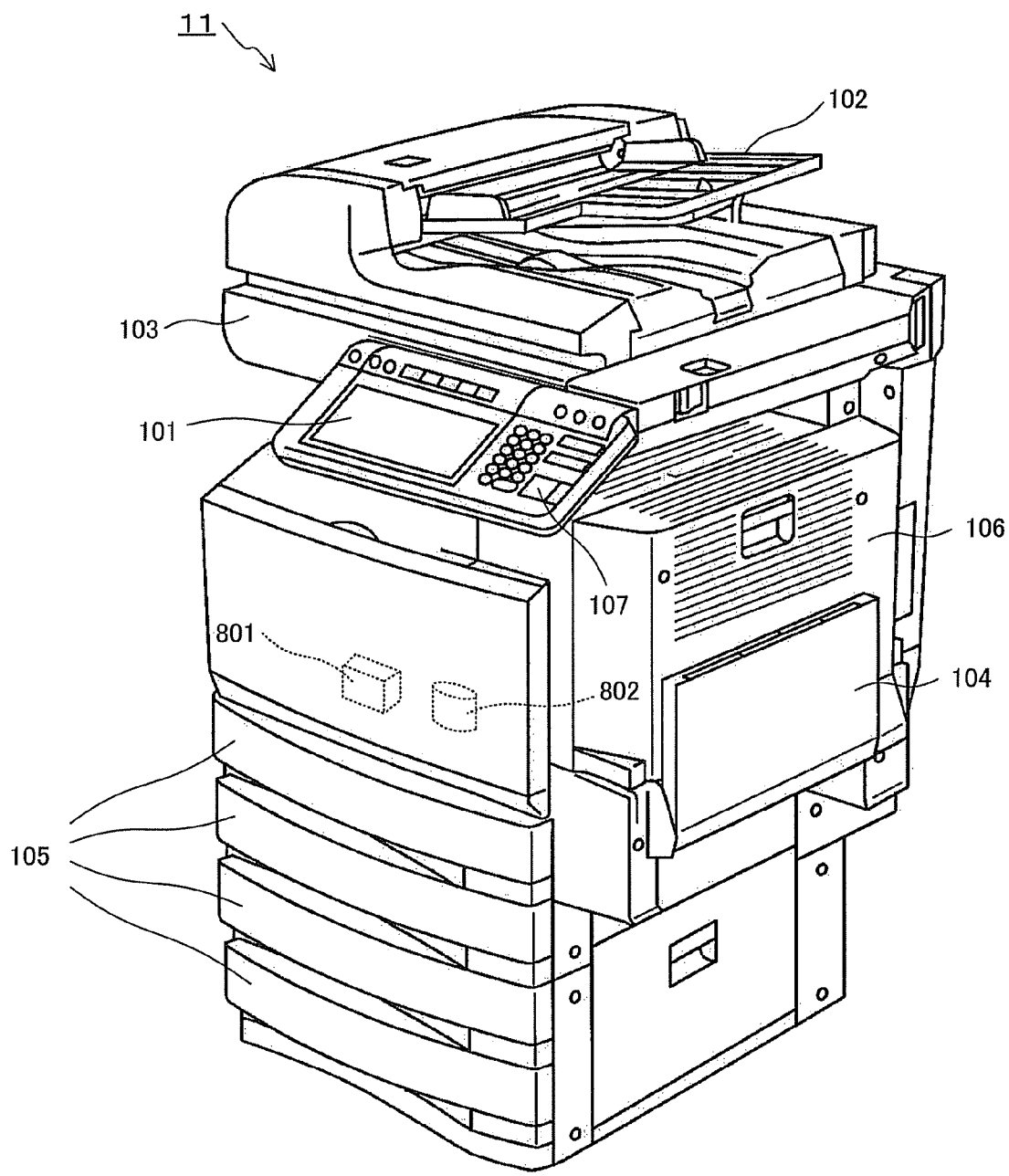
FIG. 2 is a perspective view for explaining the outline of the image processing apparatus 11 according to the present embodiment.

FIG. 2 is a perspective view for explaining the outline of the image processing apparatus 11 according to the present embodiment. In this example, the image processing apparatus 11 is an MFP (Multi Function Peripheral).

The image processing apparatus 11 according to the present embodiment includes an interface screen 101, an ADF (Auto Document Feeder) 102, an image reader section 103, a manual paper feeder 104, a paper feed cassette 105, an image forming section 106, an authentication processing section 107, a CPU 801, and a MEMORY 802.

Operation of the image processing apparatus 11 according to the present embodiment will be described below briefly. When copy processing (predetermined image processing) is carried out using the image processing apparatus 11, user authentication processing is first performed in the authentication processing section 107. Subsequently, based on an input operation of a user, who has been authenticated through the authentication processing, to the interface screen 101, a document set in the ADF 102 is automatically fed toward a document read position in the image reader section (image processing section) 103. The document fed in this manner is read by the image reader section 103. Subsequently, a paper is fed from the paper feed cassette 105 or manual paper feeder 104 according to a paper feed setting selected based on the use's input operation to the interface screen 101. The fed paper then reaches the image forming section (image processing section) 106 and is subjected to image forming processing based on the image read by the image reader section 103, and the copy processing is completed.

The interface screen 101 is constituted by, e.g., a touch panel display and serves also as an operation input section for receiving a user's input operation made based on the content displayed on the interface screen 101.

In the image processing apparatus 11, predetermined processing such as "data transmission", "call up bookmark list", "scan preview", "print", "data save", and "data call-up" can be performed. Further, in the image processing apparatus 11, a plurality of objects to be displayed such as characters or icons corresponding to the abovementioned respective predetermined processing are displayed on the interface screen 101. The term "character" used here includes "symbol", and "icon" includes "figure". Although the image processing apparatus according to the present embodiment can display at least one of the character or icon as the object to be displayed, the object to be displayed is merely referred to as "icon" in the following description for the sake of simplification. As an object to be processed by predetermined processing performed in the image processing apparatus 11, a document in a sheet form, a document in a book form, and image data can be taken as an example.

Figure 3:
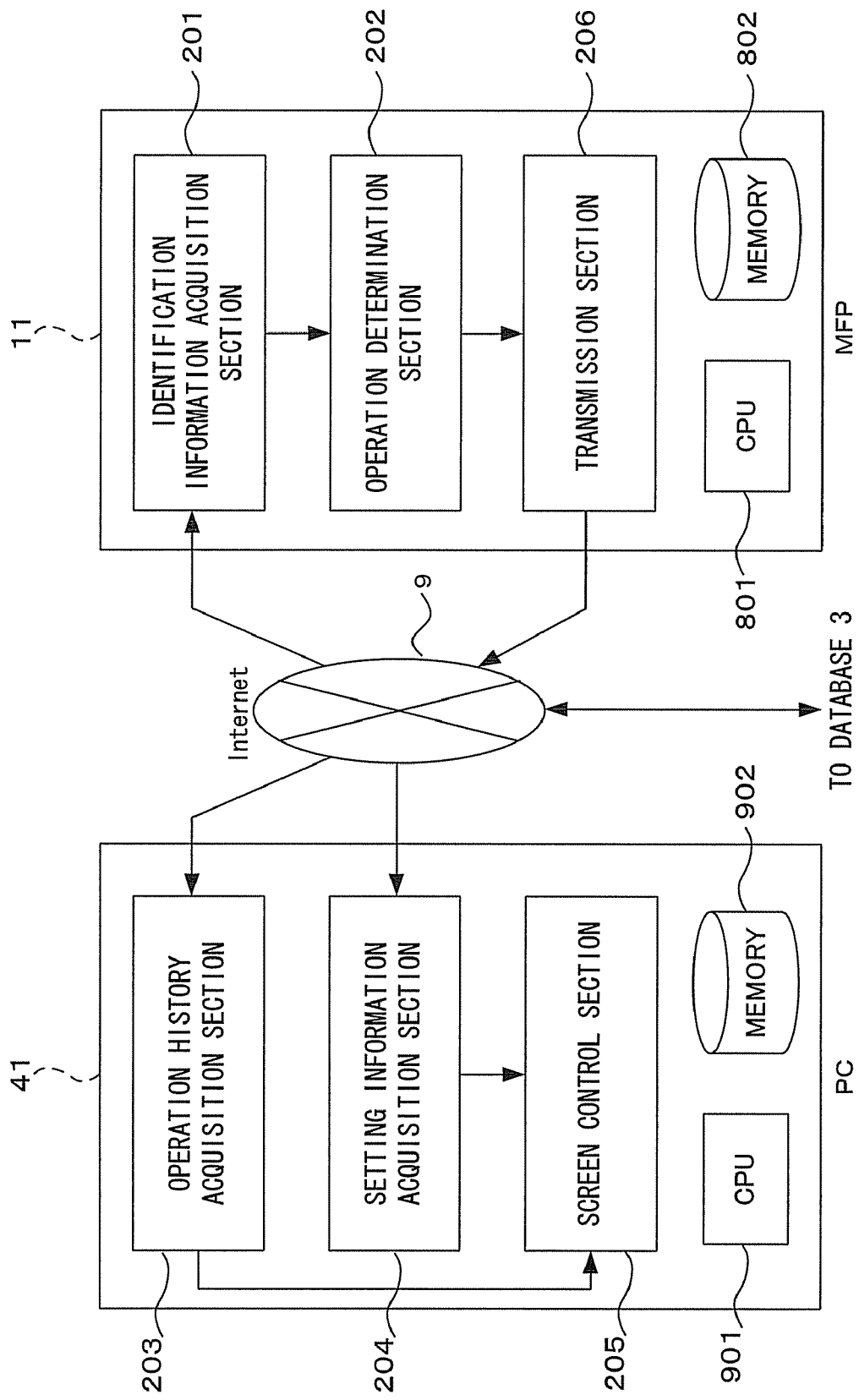
FIG. 3 is a functional block diagram for explaining the display control system according to the present embodiment.

FIG. 3 is a functional block diagram for explaining the display control system according to the present embodiment. In the present embodiment, the image processing apparatuses 11 to in have the same configuration as each other, and PCs 41 to 4n have the same configuration as each other. The display control system according to the present embodiment can be realized by any of image processing apparatuses 11 to 1n and any of PCs 41 to 4n, so that it is assumed that the display control system includes only the image processing apparatus 11 and PC 41 in the following description.

The display control system according to the present embodiment is constituted by: the image processing apparatus 11 including an identification information acquisition section 201, an operation determination section 202, a transmission section 206, a CPU 801 and a MEMORY 802; and PC 41 including an operation history acquisition section 203, a setting information acquisition section 204, a screen control section 205, a CPU 901 and a MEMORY 902. The PC 41 further has a display 41a (see FIG. 1) that can display an interface screen like the interface screen 101 in the image processing apparatus 11.

The identification information acquisition section 201 acquires identification information for identifying a user who uses the PC 41 (second device) communicably connected to the image processing apparatus 11 (first device) that can execute predetermined processing such as image read processing, image forming processing, and copy processing to perform a predetermined setting operation (relevant operation) concerning execution of the predetermined image processing. More specifically, when a user of the PC 41 uses a driver to perform a setting operation for allowing the image processing apparatus 11 to execute, e.g., print processing, the identification information acquisition section 201 acquires through the network identification information concerning the user based on login information of the PC 41 or login information from the PC 41 to image processing apparatus 11.

The operation determination section 202 determines whether there is any uncompleted job (processing that has been suspended) among those for which the setting operation has started in the first device by the user whose identification information has been acquired by the identification information acquisition section 201. The term "any uncompleted job among those for which the setting operation has started" means a state where, although various settings for, e.g., copy processing such as "number of copies" or "print density" have been made to the image processing apparatus 11, the setting operation has been suspended before start of the copy processing.

Figure 4:
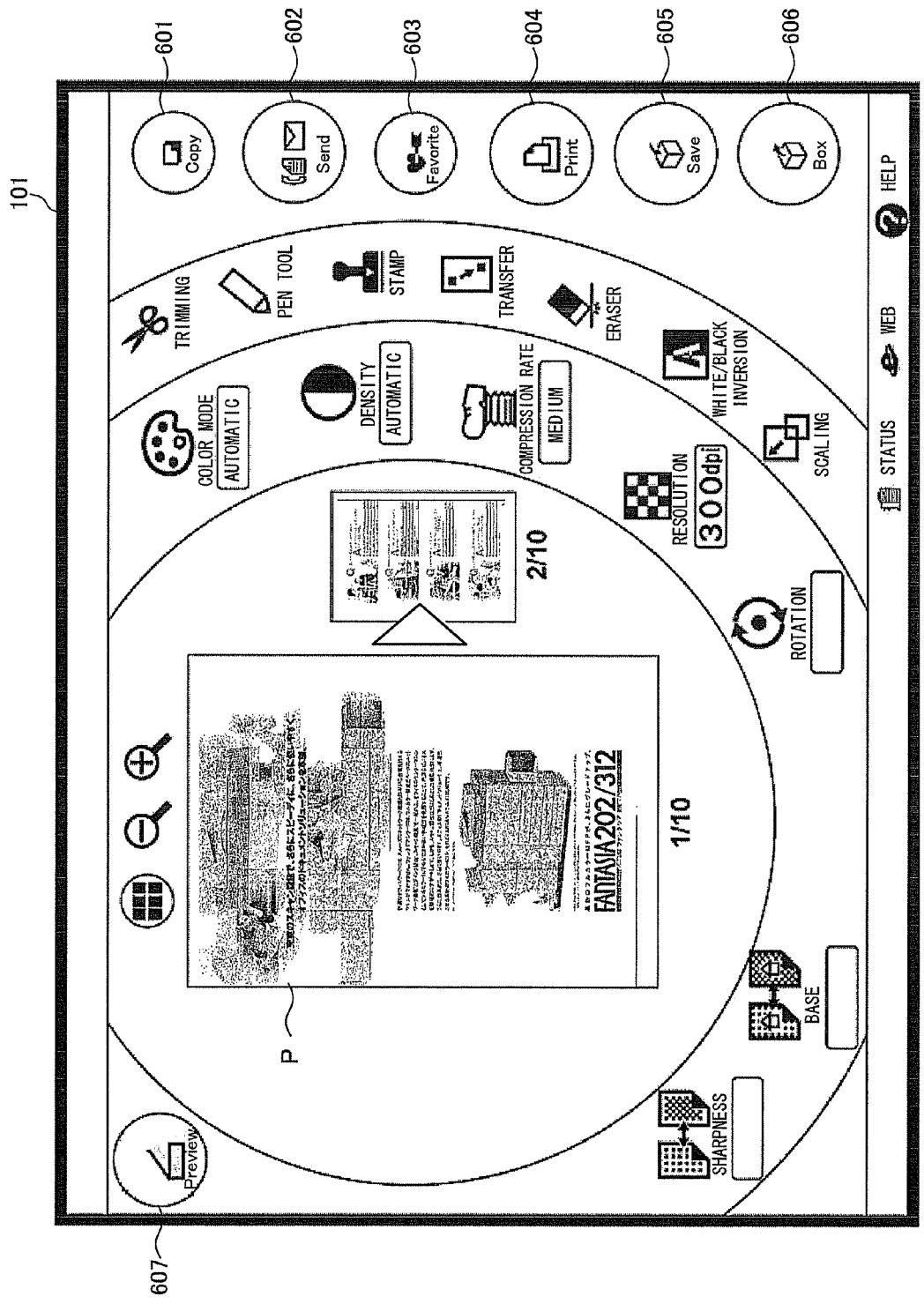
FIG. 4 is a view showing an example of an interface screen displayed on an interface screen 101 when image read processing (scan preview processing) is performed in the image processing apparatus 11.

FIG. 4 is a view showing an example of an interface screen displayed on the interface screen 101 when image read processing (scan preview processing) is performed in the image processing apparatus 11. On the interface screen shown in FIG. 4, icons that indicate detailed setting items concerning the scan preview processing are arranged in a circular ring-like icon display area, and icons 601 to 606 concerning predetermined processing other than the scan preview processing that can be executed in the image processing apparatus 11 are arranged vertically on the right side of the circular ring-like icon display area. A user makes an input operation on the interface screen 101 of the image processing apparatus 11 to start execution of the image read processing, and an image of a document is read by the image reader section 103. In FIG. 4, an image P of the document that has been read through the image read processing performed by the image processing apparatus 11 is displayed in the innermost position of the multi-ringed icon display area.

Figure 5:
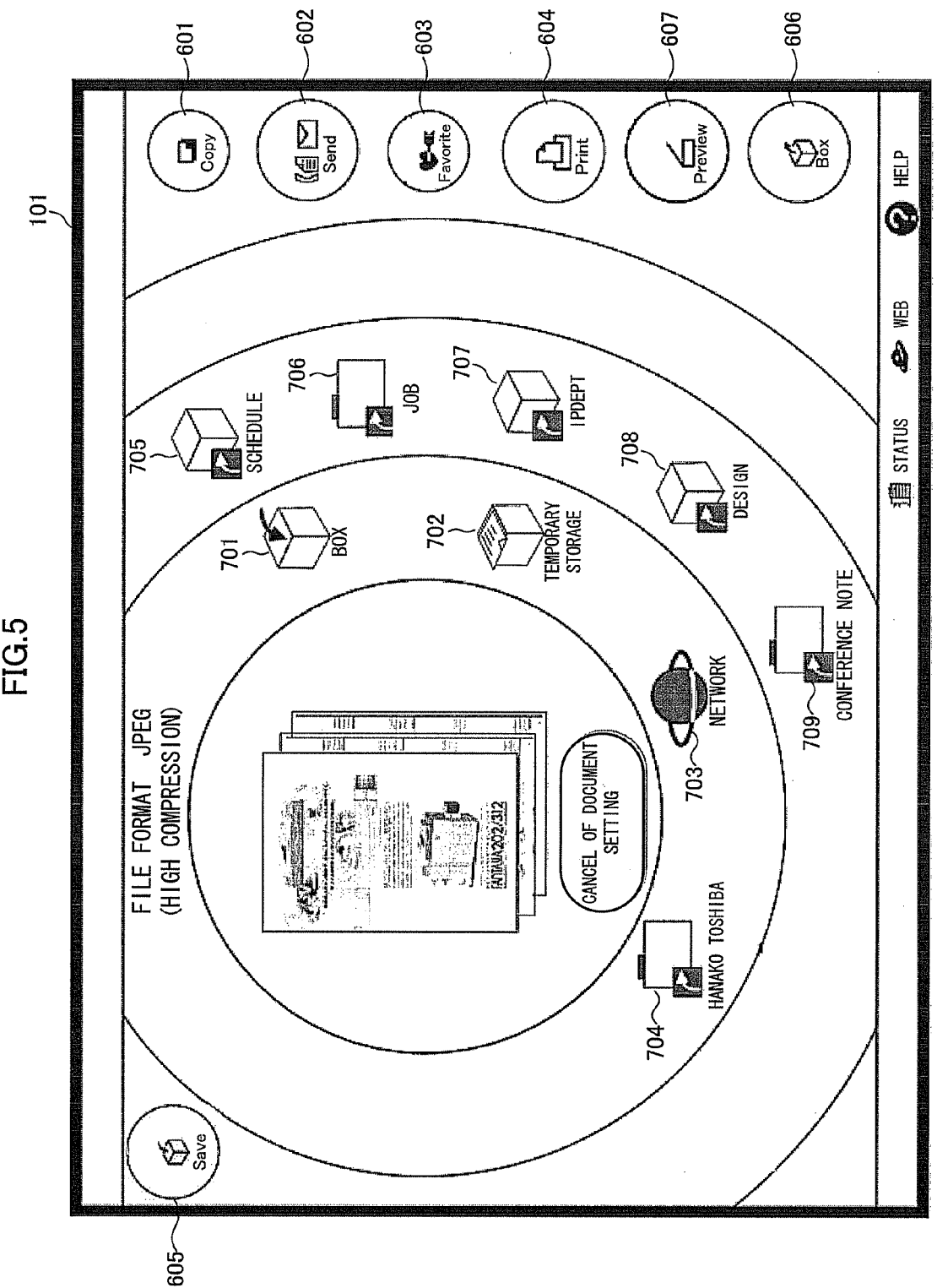
FIG. 5 is a view showing an example of an interface screen displayed on the interface screen 101 when data storage processing is performed.

When the user wants to store the document that has been read through the image read processing performed by the image processing apparatus 11 in a desired storage area as image data, he or she selects an icon 605 for switching a screen mode to a data storage processing mode. FIG. 5 is a view showing an example of an interface screen displayed on the interface screen 101 when the data storage processing is performed. The user selects on this screen an icon corresponding to his or her desired storage location from icons 701 to 709 which represent a plurality of data storage location candidates and stores the image data read through the image read processing in a location corresponding to the selected icon.

Figure 6:
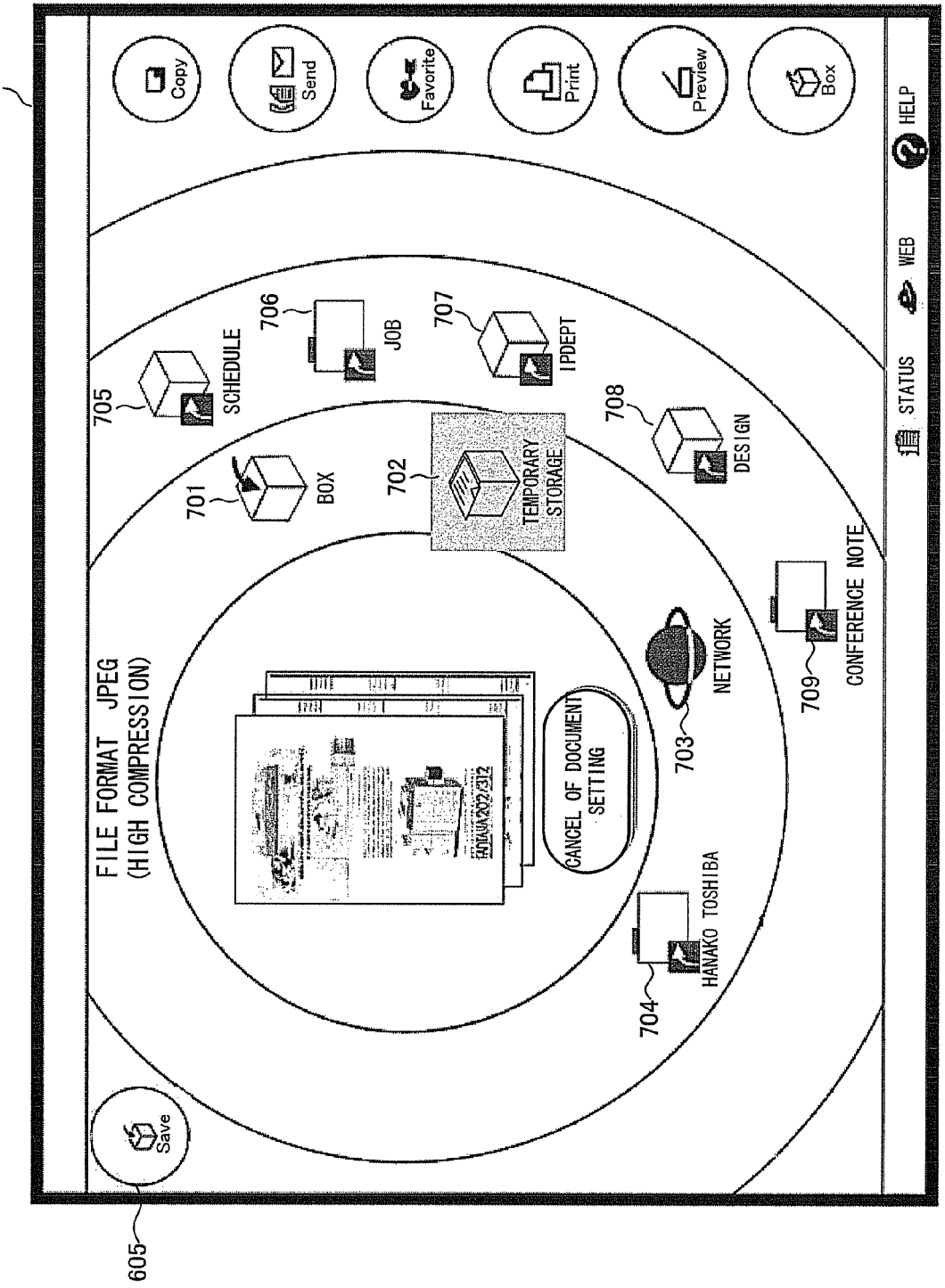
FIG. 6 is a view showing a state where an icon 702 has been selected.
Figure 7:
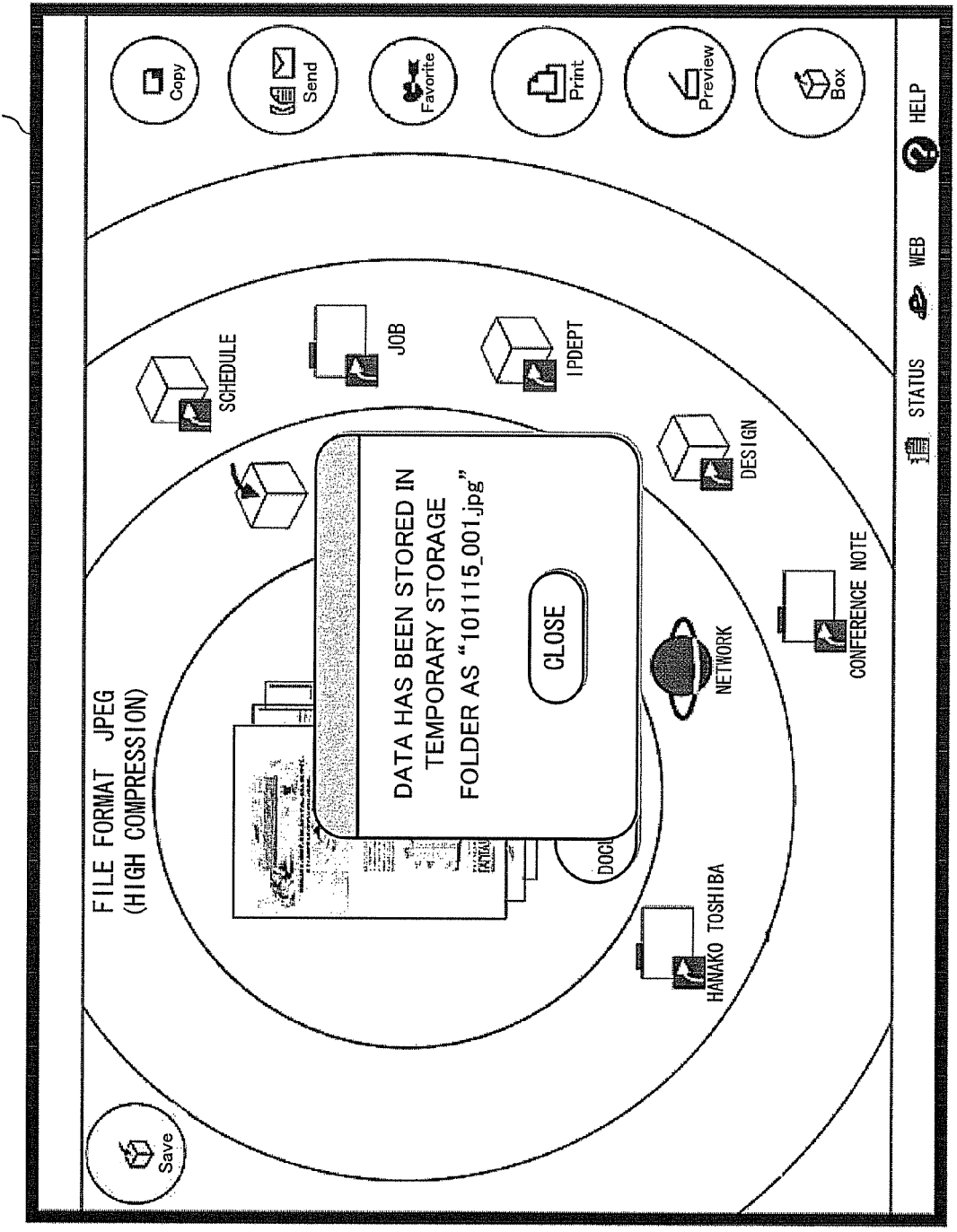
FIG. 7 is a view showing a pop-up window A displayed after data has been stored in a temporary storage folder.

Assume that there is another user who has an urgent need to use the image processing apparatus 11 in a state where the screen of FIG. 5 is displayed. In this case, the user who is performing a setting operation of the data storage processing (predetermined processing in the first device) selects an icon 702 corresponding to "temporary storage processing (predetermined data storage operation executed before execution of predetermined processing)" to temporarily store data to be stored in association with the identification information of the user in a storage area provided in the database 3. FIG. 6 is a view showing a state where the icon 702 has been selected. When the user selects the icon 702, a pop-up window is displayed to indicate that the data to be stored has temporarily been stored in a temporary storage folder in the database 3. FIG. 7 is a view showing a pop-up window A displayed after the data has been stored in the temporary storage folder. In the case where the user's setting operation has been canceled in the image processing apparatus 11, the transmission section 206 transmits operation log information concerning the setting operation in association with the identification information of the user (who has canceled the setting operation) to the database 3 or PC 41.

The user who has allowed the another user having an urgent task to use the image processing apparatus 11 as described above can continue, on the PC 41, the setting operation of the data storage processing that has been performed in the image processing apparatus 11. The abovementioned acquisition of the user identification information is acquired from ID information of a user who has logged-in the PC 41 when the operation that has been canceled is resumed as described above.

The operation history acquisition section 203 activates a driver for controlling the image processing apparatus 11 from the PC 41 so as to perform a desired setting operation. Then, in the case where it has been determined by the operation determination section 202 that there is any uncompleted processing (data storage processing in the above example), the operation history acquisition section 203 acquires information concerning the operation history in the relevant operation for the uncompleted processing. The term "information concerning the operation history in the relevant operation for the uncompleted processing" used here means information indicating the content of input information concerning the setting operation required for execution of the predetermined image processing, selection information concerning icons or characters, screen scroll amount (information indicating which portion of the display target area has been displayed by scrolling the screen to the unseen display target area), and information concerning zoom setting. In this example, the user performs the temporary storage processing as an operation relevant to the data storage processing, so that the operation history acquisition section 203 acquires operation log information concerning the temporary storage processing from the database 3 or image processing apparatus 11.

Then, the setting information acquisition section 204 acquires from the database 3 setting information concerning the display of the interface screen corresponding to the user whose identification information has been acquired by the identification information acquisition section 201. The setting information acquired by the setting information acquisition section 204 is the same as the setting information concerning the display of the interface screen on the image processing apparatus 11 which corresponds to the user whose identification information has been acquired by the identification information acquisition section 201. Further, the interface screens of the PC 41 and image processing apparatus 11 are displayed in the same design. The term "setting information concerning the display of the interface screen" used here means information concerning a degree of highlight of objects to be displayed such as icons or arrangement of icons on the screen. Note that, the user identification information utilized for acquisition of the information in the operation history acquisition section 203 and setting information acquisition section 204 need not be acquired from the image processing apparatus 11 but the identification information acquired at the login time to the PC 41 may be utilized.

The screen control section 205 displays the interface screen on the display 41a of the PC 41 based on the information acquired from the setting information acquisition section 204 and, at the same time, reflects the information acquired by the operation history acquisition section 203 on the interface screen as operation content.

Based on the setting information acquired as described above, the screen control section 205 changes at least any of the contents of characters, font thereof, line weight thereof, tilt thereof, shape of figures, line weight, brightness, size, motion, saturation, and contrast value to thereby highlight the objects to be displayed.

Figure 8:
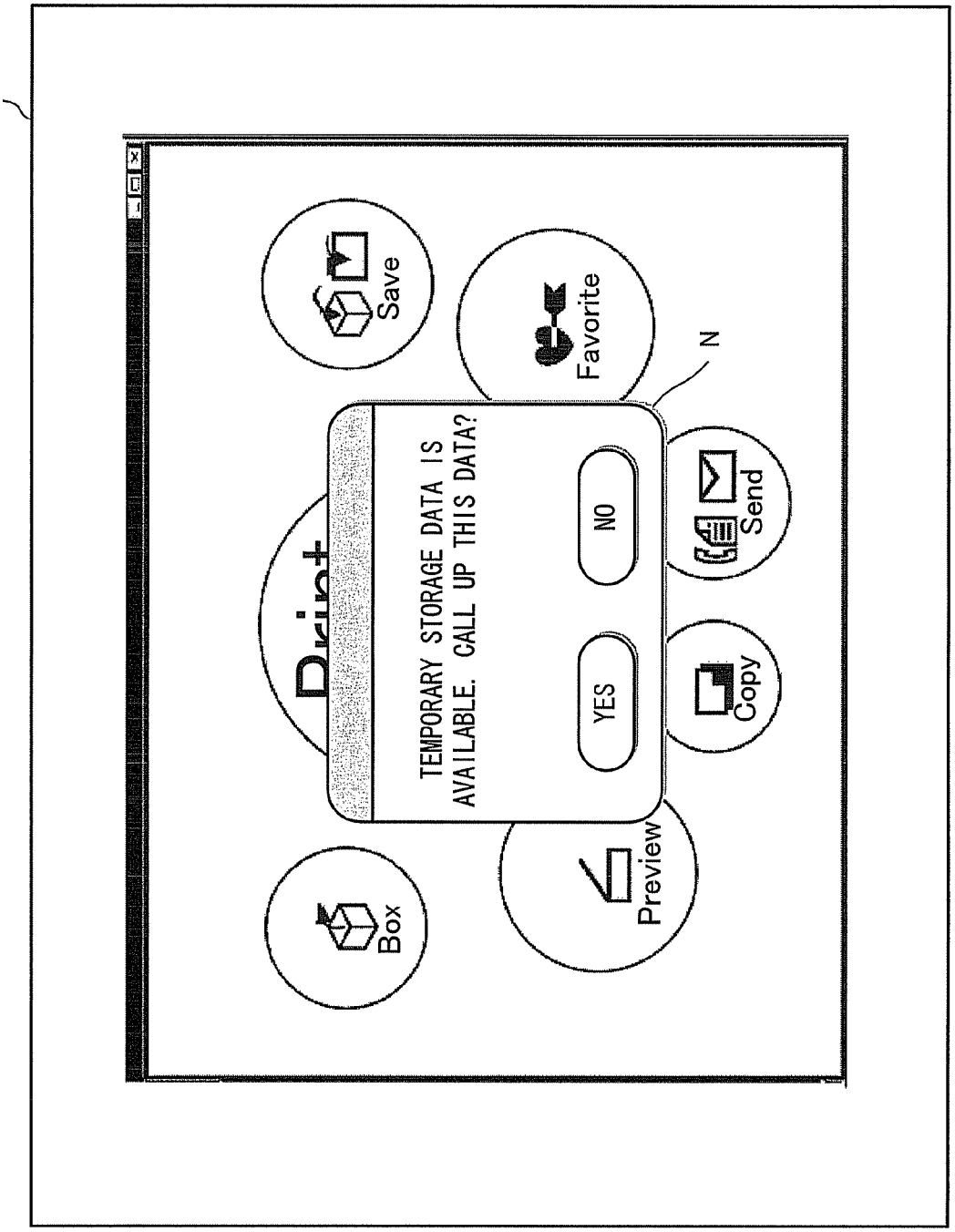
FIG. 8 is a view showing an example in which a window notifying existence of temporary storage data has been displayed on the interface screen displayed on a display 41a of the PC 41 based on user's setting information.

Further, in the case where the user for which the operation history has been acquired has performed data temporary storage processing, the screen control section 205 performs a notification N concerning the predetermined data storage operation on the interface screen displayed on the display 41a of the PC 41 based on the information acquired by the operation history acquisition section 203. FIG. 8 is a view showing an example in which a window notifying existence of the temporary storage data has been displayed on the interface screen displayed on the display 41a of the PC 41 based on user's setting information.

Figure 9:
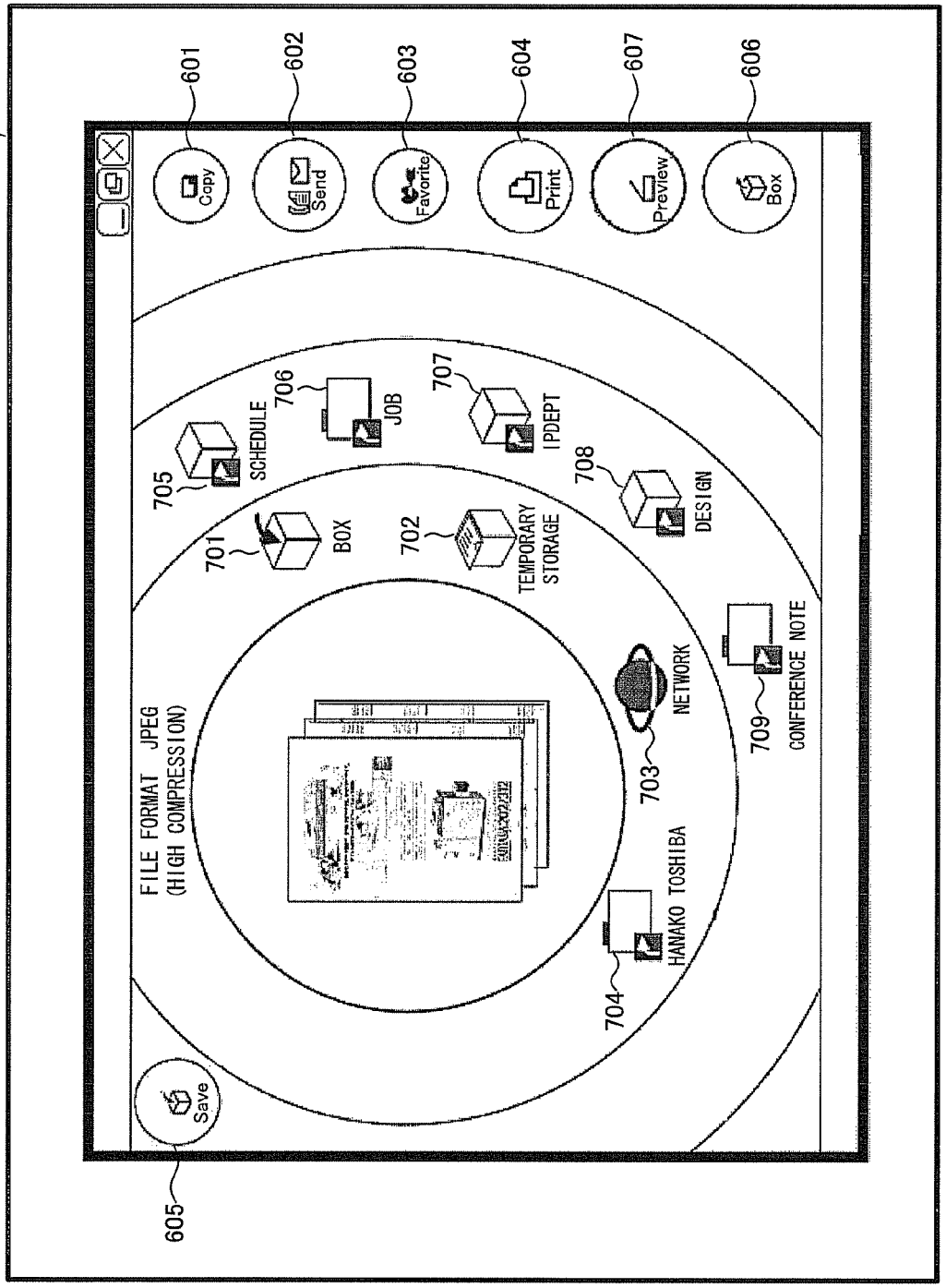
FIG. 9 is a view showing an example in which the operating condition shown in FIG. 5 has been reproduced on the display 41a of the PC 41.

When the user selects a button icon "YES" for calling up temporary storage data on the screen shown in FIG. 8, the screen control section 205 displays the interface screen representing the operating condition at the time when the data is temporarily stored. FIG. 9 is a view showing an example in which the operating condition shown in FIG. 5 has been reproduced on the display 41a of the PC 41. The user can re-store the temporary storage data in a desired storage location without being influenced by another user's urgent task. As described above, based on the information acquired by the operation history acquisition section 203, the screen control section 205 displays a notification for prompting the user to access the data temporarily stored in the database 3 (predetermined storage area) on the interface screen displayed on the display 41a of the PC 41.

Figure 10:
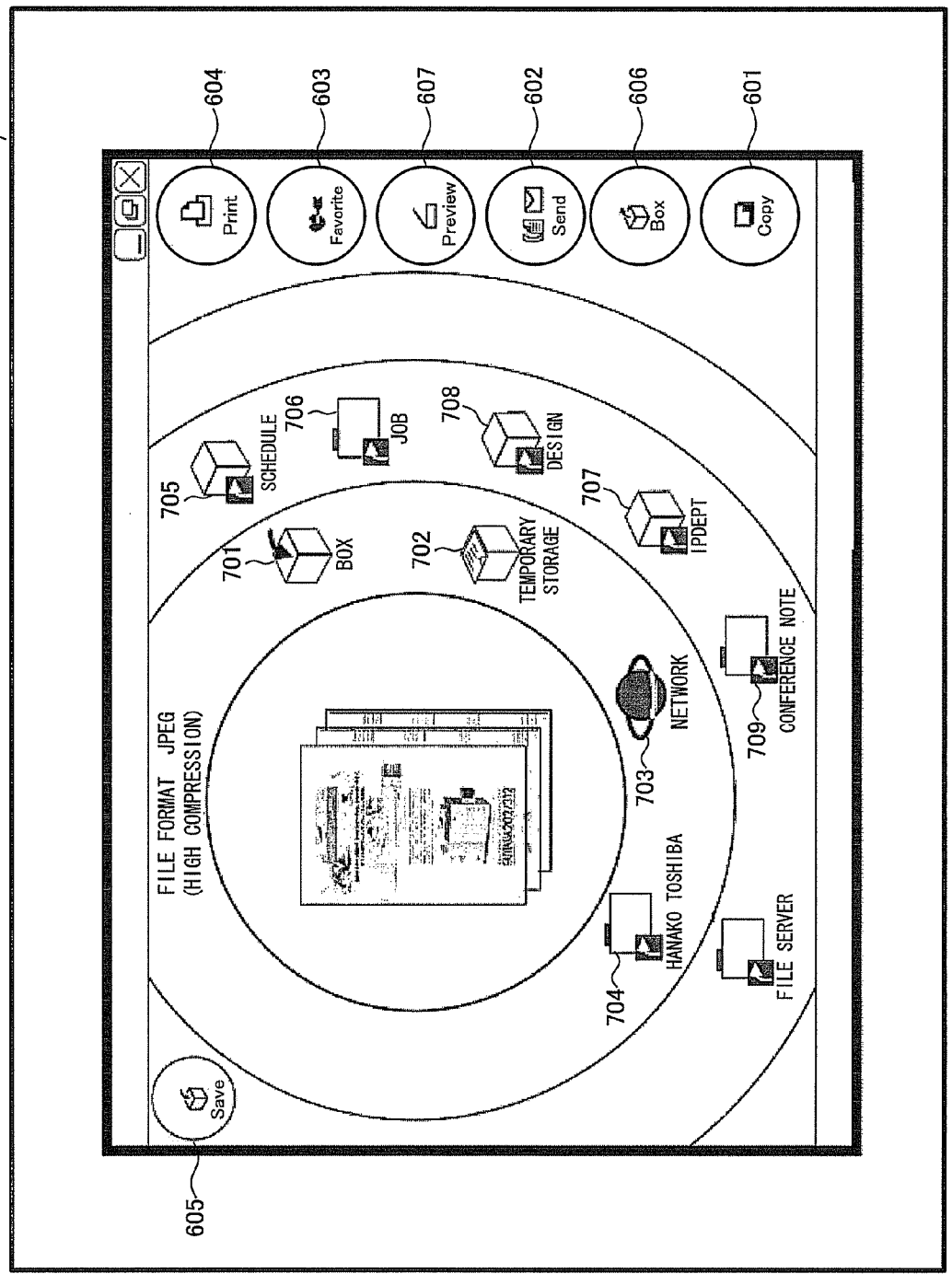
FIG. 10 is a view showing an example in which a screen control section 205 uses "display setting in the case where a user uses the PC 41" to display the interface screen.

Although the screen control section 205 uses the operating condition and "display setting in the case where the user uses the image processing apparatus 11" to display the interface screen in the screen example shown in FIG. 9, the display method is not limited to this. For example, the screen control section 205 may use "display setting in the case where the user uses the PC 41" to display the interface screen. The term "display setting in the case where the user uses the image processing apparatus 11" means the display setting on which, e.g., the frequency at which the user selects a given icon on the image processing apparatus 11 is reflected, and "display setting in the case where the user uses the PC 41" means the display setting on which, e.g., the frequency at which the user selects a given icon on the PC 41 is reflected. FIG. 10 is a view showing an example in which the screen control section 205 uses the "display setting in the case where the user uses the PC 41" to display the interface screen.

The CPU 801 and CPU 901 have a role of performing various processing in the image processing apparatus 11 and PC 41 and also have a role of executing programs stored in the MEMORY 802 and MEMORY 902 to implement various functions. The MEMORY 802 and MEMORY 902, which are each constituted by a RAM or ROM, have a role of storing various information or programs used in the image processing apparatus 11 and PC 41.

Figure 11:
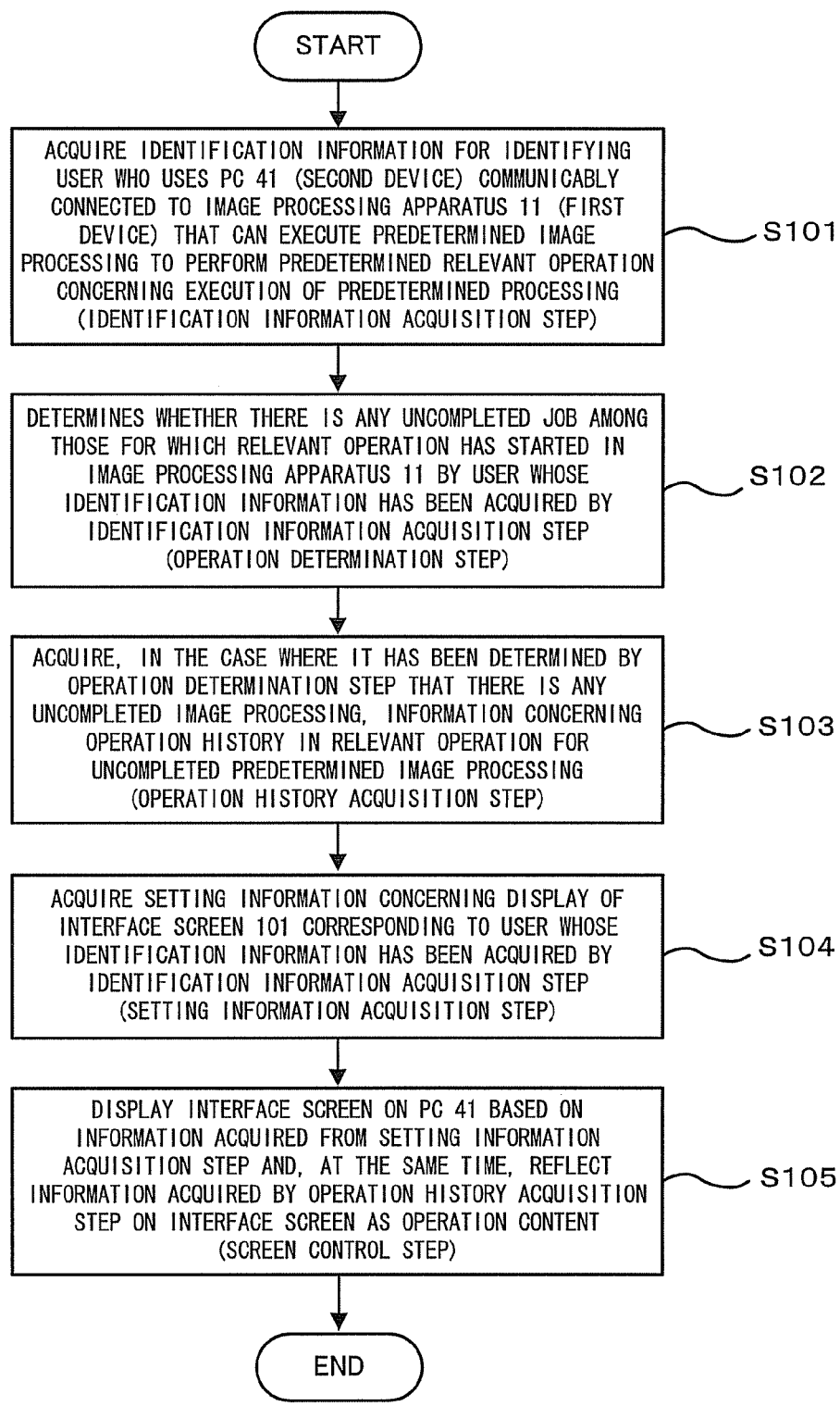
FIG. 11 is a flowchart for explaining the flow of processing (display control method) performed in the display control system according to the present embodiment.

FIG. 11 is a flowchart for explaining the flow of processing (display control method) performed in the display control system according to the present embodiment.

The identification information acquisition section 201 acquires identification information for identifying a user who uses the PC 41 (second device) communicably connected to the image processing apparatus 11 (first device) that can execute predetermined processing to perform a predetermined relevant operation concerning execution of the predetermined image processing (identification information acquisition step) (S101). The term "predetermined relevant operation concerning execution of predetermined image processing" means a setting operation concerning execution of predetermined image processing.

Further, as a relevant operation concerning the predetermined image processing performed in the image processing apparatus 11, a predetermined data storage operation to be performed ahead of execution of the predetermined image processing can be taken. The term "predetermined storage operation" used here is an operation to store data to be stored in a predetermined storage area corresponding to a user whose identification information has been acquired by the identification information acquisition step.

The operation determination section 202 determines whether there is any uncompleted job among those for which the relevant operation has started in the image processing apparatus 11 by the user whose identification information has been acquired by the identification information acquisition step (operation determination step) (S102).

Then, in the case where it has been determined by the operation determination step that there is any uncompleted predetermined image processing, the operation history acquisition section 203 acquires information concerning the operation history in the relevant operation for the uncompleted predetermined image processing (operation history acquisition step) (S103). The operation history acquisition section 203 can also acquire information concerning the operation history in the data storage operation that the user whose identification information has been acquired by the identification information acquisition step performs on the image processing apparatus.

The setting information acquisition section 204 acquires setting information concerning the display of the interface screen 101 corresponding to the user whose identification information has been acquired by the identification information acquisition step (setting information acquisition step) (S104). The term "setting information" used here means information concerning a degree of highlight of objects to be displayed on the interface screen. The setting information acquired by the setting information acquisition step is the same as the setting information concerning the display of the interface screen 101 on the image processing apparatus 11 which corresponds to the user whose identification information has been acquired by the identification information acquisition step. The objects to be displayed used here include characters or icons.

The screen control section 205 displays the interface screen on the PC 41 based on the information acquired from the setting information acquisition step and, at the same time, reflects the information acquired by the operation history acquisition step on the interface screen as operation content (screen control step) (S105). Further, in the screen control step, based on the information acquired by the operation history acquisition step, a notification for prompting a user to access data stored in a predetermined storage area is displayed on the interface screen on the PC 41. Further, in the screen control step, based on the setting information acquired by the setting information acquisition step, at least any of the contents of characters, font thereof, line weight thereof, tilt thereof, shape of figures, line weight, brightness, size, motion, saturation, and contrast value is changed to thereby highlight the objects to be displayed.

The above respective steps in the processing performed in the display control system are realized by the CPU 801 and CPU 901 executing a display control program stored in the MEMORY 802 and MEMORY 902.

In the embodiment, there has been explained the case where the function for implementing the present invention is previously stored inside the apparatus, but the present invention is not limited thereto, and a similar function may be downloaded from the network into the apparatus or a recording medium on which a similar function is stored is installed in the apparatus. The recording medium may be any form of recording medium such as CD-ROM which can store programs and is readable by the apparatus. The function which can be previously obtained through installing or downloading may be realized in cooperation with the OS (operating system) inside the apparatus.

As described above, according to the present embodiment, even in the case where an operation performed on the image processing apparatus needs to be interrupted, it is possible to quickly access stored data from the PC when resuming the interrupted operation on the PC 41 side without consciousness of the location of data temporarily stored. Further, the interface screen of a printer driver of the image processing apparatus 11 and that of the PC 41 are made in the same design, thus maintaining operational consistency between the image processing apparatus 11 and PC 11 and enhancing operability thereof.

In the case where a plurality of documents have been scanned in the image processing apparatus 11 and thereby there exist a plurality of temporarily stored data, thumbnails and file names respectively corresponding to the plurality of temporarily stored data are displayed on the screen of the PC, which allows a user to select a desired data based on the thumbnails and the like.

Although the exemplary embodiment of the present invention has been shown and described, it will be apparent to those having ordinary skill in the art that a number of changes, modifications, or alternations to the invention as described herein may be made within the spirit of the present invention.

As has been described above in detail, according to the present invention, it is possible to provide a technique capable of reducing time period during which an apparatus to be shared by a plurality of users is occupied by a specified user performing a setting operation and contributing to an improvement in operability and working efficiency.

What is claimed is:

1. A display control system implemented on a processor, comprising:
    an identification information acquisition component that acquires identification information for identifying a user who uses a second device communicably connected to a first device that can execute predetermined processing to perform a predetermined relevant operation concerning execution of the predetermined processing;
    an operation determination component that determines whether there is any uncompleted job among those for which the predetermined relevant operation has started in the first device by the user whose identification information has been acquired by the identification information acquisition component;
    an operation history acquisition component that acquires information concerning the operation history in the predetermined relevant operation for the uncompleted predetermined processing in the case where it has been determined by the operation determination component that there is any uncompleted predetermined processing;
    a setting information acquisition component that acquires setting information concerning the display of an interface screen corresponding to the user whose identification information has been acquired by the identification information acquisition component; and a screen control component that displays the interface screen on the second device based on the information acquired from the setting information acquisition component and, at the same time, reflects the information acquired by the operation history acquisition component on the interface screen as operation content;
    wherein the predetermined relevant operation concerning the predetermined processing performed on the first device is a predetermined data storage operation performed ahead of execution of the predetermined processing, the operation history acquisition component acquires information concerning the operation history in the data storage operation that the user whose identification information has been acquired by the identification information acquisition component performs on the first device, and
    based on the information acquired by the operation history acquisition component, the screen control component displays a notification concerning the predetermined data storage operation on the interface screen on the second device;
    wherein the predetermined data storage operation is an operation to store data to be stored in a predetermined storage area corresponding to the user whose identification information has been acquired by the identification information acquisition component, and based on the information acquired by the operation history acquisition component, the screen control component displays a notification for prompting the user to access data stored in the predetermined storage area on the interface screen on the second device.

2. The display control system according to claim 1, wherein
    the setting information acquired by the setting information acquisition component is the same as the setting information concerning the display of the interface screen on the first device which corresponds to the user whose identification information has been acquired by the identification information acquisition component.

3. The display control system according to claim 1, wherein
the relevant operation is a setting operation concerning the predetermined processing.

4. The display control system according to claim 1, wherein
the first device is an image processing apparatus, and the predetermined processing is image processing.

5. The display control system according to claim 1, wherein
the setting information is information concerning a degree of highlight of objects to be displayed on the interface screen,
the objects to be displayed include characters or icons, and
based on the setting information, the screen control component changes at least any of the contents of characters, font thereof, line weight thereof, tilt thereof, shape of figures, line weight, brightness, size, motion, saturation, and contrast value to thereby highlight the objects to be displayed.

6. An image processing apparatus having a memory capable of executing predetermined image processing, comprising:
an identification information acquisition section that acquires identification information for identifying a user who uses an external device communicably connected to the image processing apparatus to perform a predetermined relevant operation concerning execution of the predetermined image processing;
an operation determination section that determines whether there is any uncompleted job among those for which the predetermined relevant operation has started in the image processing apparatus by the user whose identification information has been acquired by the identification information acquisition section; and
a transmission section that transmits information of the operation history in the predetermined relevant operation concerning the uncompleted predetermined processing to the external device in the case where it has been determined by the operation determination section that there is any uncompleted predetermined processing;
a setting information acquisition section that acquires setting information concerning the display of an interface screen corresponding to the user whose identification information has been acquired by the identification information acquisition component; and a screen control section that displays the interface screen on the second device based on the information acquired from the setting information acquisition component and, at the same time, reflects the information acquired by the operation history acquisition component on the interface screen as operation content;
wherein the predetermined relevant operation concerning the predetermined processing performed on the first device is a predetermined data storage operation performed ahead of execution of the predetermined processing, the operation history acquisition step acquires information concerning the operation history in the data storage operation that the user whose identification information has been acquired by the identification information acquisition step performs on the first device, and
based on the information acquired by the operation history acquisition step, the screen control step displays a notification concerning the predetermined data storage operation on the interface screen on the second device; wherein the predetermined data storage operation is an operation to store data to be stored in a predetermined storage area corresponding to the user whose identification information has been acquired by the identification information acquisition step, and based on the information acquired by the operation history acquisition step, the screen control step displays a notification for prompting the user to access data stored in the predetermined storage area on the interface screen on the second device.

7. A display control method comprising:
acquiring identification information for identifying a user who uses a second device communicably connected to a first device that can execute predetermined processing to perform a predetermined relevant operation concerning execution of the predetermined processing; wherein the predetermined relevant concerning the predetermined processing performed on the first device is a predetermined data storage operation performed ahead of execution of the predetermined processing,
determining whether there is any uncompleted job among those for which the predetermined relevant operation has started in the first device by the user whose identification information has been acquired by the identification information acquisition step;
acquiring information concerning the operation history in the predetermined relevant operation for the uncompleted predetermined processing in the case where it has been determined by the operation determination step that there is any uncompleted predetermined processing;
acquiring setting information concerning the display of an interface screen corresponding to the user whose identification information has been acquired by the identification information acquisition step; and
displaying the interface screen on the second device based on the information acquired from the setting information acquisition step and, at the same time, reflecting the information acquired by the operation history acquisition step on the interface screen as operation content;
acquiring information concerning the operation history in the data storage operation that the user whose identification information has been acquired by the identification information acquisition component performs on the first device, and based on the information acquired by the operation history acquisition component, the screen control component displays a notification concerning the predetermined data storage operation on the interface screen on the second device; wherein the predetermined data storage operation is an operation to store data to be stored in a predetermined storage area corresponding to the user whose identification information has been acquired by the identification information acquisition step, and based on the information acquired by the operation history acquisition step, the screen control step displays a notification for prompting the user to access data stored in the predetermined storage area on the interface screen on the second device.

8. The display control method according to claim 7, wherein
the setting information acquired by the setting information acquisition step is the same as the setting information concerning the display of the interface screen on the first device which corresponds to the user whose identification information has been acquired by the identification information acquisition step.

9. The display control method according to claim 7, wherein
the relevant operation is a setting operation concerning the predetermined processing.

10. The display control method according to claim 7, wherein
the first device is an image processing apparatus, and the predetermined processing is image processing.

11. The display control method according to claim 7, wherein
the setting information is information concerning a degree of highlight of objects to be displayed on the interface screen,
the objects to be displayed include characters or icons, and
based on the setting information, the screen control step changes at least any of the contents of characters, font thereof, line weight thereof, tilt thereof, shape of figures, line weight, brightness, size, motion, saturation, and contrast value to thereby highlight the objects to be displayed.

12. A display control system comprising:
a processor configured to execute:
identification information acquisition component that acquires identification information for identifying a user who uses a second device communicably connected to a first device that can execute predetermined processing to perform a predetermined relevant operation concerning execution of the predetermined processing;
operation determination component that determines whether there is any uncompleted job among those for which the predetermined relevant operation has started in the first device by the user whose identification information has been acquired by the identification information acquisition component;
operation history acquisition component that acquires information concerning the operation history in the predetermined relevant operation for the uncompleted predetermined processing in the case where it has been determined by the operation determination component that there is any uncompleted predetermined processing;
setting information acquisition component that acquires setting information concerning the display of an interface screen corresponding to the user whose identification information has been acquired by the identification information acquisition component; and screen control component that displays the interface screen on the second device based on the information acquired from the setting information acquisition component and, at the same time, reflecting the information acquired by the operation history acquisition component on the interface screen as operation content;
wherein the predetermined relevant operation concerning the predetermined processing performed on the first device is a predetermined data storage operation performed ahead of execution of the predetermined processing, the operation history acquisition component acquires information concerning the operation history in the data storage operation that the user whose identification information has been acquired by the identification information acquisition component performs on the first device, and
based on the information acquired by the operation history acquisition component, the screen control component displays a notification concerning the predetermined data storage operation on the interface screen on the second device; wherein the predetermined data storage operation is an operation to store data to be stored in a predetermined storage area corresponding to the user whose identification information has been acquired by the identification information acquisition component, and based on the information acquired by the operation history acquisition component, the screen control component displays a notification for prompting the user to access data stored in the predetermined storage area on the interface screen on the second device.

13. The display control system according to claim 12, wherein
the setting information acquired by the setting information acquisition component is the same as the setting information concerning the display of the interface screen on the first device which corresponds to the user whose identification information has been acquired by the identification information acquisition component.

14. The display control system according to claim 12, wherein
the relevant operation is a setting operation concerning the predetermined processing.

15. The display control system according to claim 12, wherein
the first device is an image processing apparatus, and the predetermined processing is image processing.

* * * * *